US012626631B2

(12) United States Patent
Yeh et al.

(10) Patent No.: US 12,626,631 B2
(45) Date of Patent: May 12, 2026

(54) PIXEL CIRCUIT AND DRIVING METHOD THEREOF

(71) Applicant: AUO Corporation, Hsinchu City (TW)

(72) Inventors: Yen-Wei Yeh, Hsinchu City (TW); Wei-Li Lin, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/967,542

(22) Filed: Dec. 3, 2024

(65) Prior Publication Data

US 2026/0120606 A1 Apr. 30, 2026

(30) Foreign Application Priority Data

Oct. 25, 2024 (TW) ................................ 113140734

(51) Int. Cl.

| | |
|---|---|
| ***G09G 3/20*** | (2006.01) |
| ***G09G 3/32*** | (2016.01) |
| *G09G 3/00* | (2006.01) |

(52) U.S. Cl.

CPC ............. *G09G 3/2007* (2013.01); *G09G 3/32* (2013.01); *G09G 3/006* (2013.01); *G09G 2300/0819* (2013.01); *G09G 2300/0842* (2013.01); *G09G 2310/08* (2013.01); *G09G 2320/02* (2013.01); *G09G 2320/0209* (2013.01); *G09G 2330/12* (2013.01)

(58) Field of Classification Search

CPC ......... G09G 3/2007; G09G 3/32–3291; G09G 2300/0421–043; G09G 2300/0809–0819; G09G 2300/0842; G09G 2300/0861; G09G 2310/0243–0251; G09G 2310/06–063; G09G 2310/08; G09G 2320/02; G09G 2320/0209–0223; G09G 2320/2033; G09G 2320/0242; G09G 2320/0252; G09G 2320/0257; G09G 2320/0266; G09G 2320/04; G09G 2330/12

See application file for complete search history.

(56) References Cited

U.S. PATENT DOCUMENTS

| | | | | |
|---|---|---|---|---|
| 12,417,734 | B2 | 9/2025 | Chen et al. | |
| 2018/0151115 | A1* | 5/2018 | Tseng | G09G 3/3233 |
| 2019/0066598 | A1* | 2/2019 | Kim | G09G 3/3291 |
| 2019/0325824 | A1* | 10/2019 | Chen | G09G 3/3266 |
| 2025/0014508 | A1 | 1/2025 | Ying-Chieh et al. | |

FOREIGN PATENT DOCUMENTS

| | | | | |
|---|---|---|---|---|
| EP | 3156994 A1 * | 4/2017 | | G09G 3/3291 |
| TW | 1855761 B | 9/2024 | | |

* cited by examiner

*Primary Examiner* — Nathan Danielsen
(74) *Attorney, Agent, or Firm* — JCIPRNET

(57) ABSTRACT

A pixel circuit and a driving method thereof are provided. The pixel circuit includes a capacitor, a reset circuit, a writing circuit, a driving circuit, and a light-emitting diode. The capacitor is coupled to a node. The reset circuit controlled by a reset signal and is configured to reset a voltage at the node based on a reference voltage. The writing circuit is controlled by a writing signal and is configured to write a gray-level voltage into the capacitor. The driving circuit is controlled by a driving signal and is configured to generate a driving current based on the voltage at the node to drive the light-emitting diode. An enabling period of the reset signal partially overlaps with an enabling period of the writing signal, so that the gray-level voltage is written into the capacitor while the reference voltage is applied to the node.

14 Claims, 8 Drawing Sheets

PIXEL CIRCUIT AND DRIVING METHOD THEREOF

CROSS-REFERENCE TO RELATED APPLICATION

This application claims the priority benefit of Taiwan application serial no. 113140734, filed on Oct. 25, 2024. The entirety of the above-mentioned patent application is hereby incorporated by reference herein and made a part of this specification.

BACKGROUND

Technical Field

The disclosure relates to a pixel circuit applicable to a light-emitting diode.

Description of Related Art

In the related art, display panels are widely applied in various display apparatuses, and one of the core components is the pixel circuit. A pixel circuit typically includes multiple transistors, one or more capacitors, and a light-emitting diode (LED), and these components work together to achieve the function of image display. Each pixel circuit goes through multiple different operation periods during operation. For instance, during a specific period of time, a gray-level voltage is written and stored into a capacitor and then drives an LED to emit light. However, in some products, the time it takes to charge the capacitor is shortened. For instance, with the increase in display resolution and high refresh rate, the capacitor cannot be fully charged within a limited time. In addition, due to the capacitive coupling phenomenon in the pixel circuit, when the voltage on the data line changes, these changes may couple to the capacitor, causing the voltage in the pixel circuit to shift, so the display effect is thereby affected.

SUMMARY

The disclosure provides a pixel circuit and a driving method of the pixel circuit capable of solving the display abnormality problem caused by the voltage change on the data line when the charging time is excessively short.

The disclosure provides a pixel circuit including a capacitor, a reset circuit, a writing circuit, a driving circuit, and a light-emitting diode. The capacitor is coupled to a node. The reset circuit is controlled by at least one reset signal and is configured to reset a voltage at the node based on at least one reference voltage. The writing circuit is controlled by a writing signal and is configured to write a gray-level voltage into the capacitor and change the voltage at the node to respond to a critical voltage. The driving circuit is controlled by a driving signal and is configured to generate a driving current based on the voltage at the node. The light-emitting diode is coupled to the driving circuit, and brightness of the light-emitting diode changes with the driving current. An enabling period of the reset signal partially overlaps with an enabling period of the writing signal, so that the gray-level voltage is written into the capacitor while the reference voltage is applied to the node.

In an embodiment of the disclosure, the reference voltage includes a first reference voltage and a second reference voltage. The reset circuit includes a first transistor, a second transistor, and a third transistor. In the first transistor, a first terminal thereof is coupled to the first reference voltage, a second terminal thereof is coupled to a first terminal of the capacitor, and a control terminal thereof receives the reset signal. In the second transistor, a first terminal thereof is coupled to a second terminal of the capacitor, a second terminal thereof is coupled to the second reference voltage, and a control terminal thereof receives the reset signal. In the third transistor, a first terminal thereof is coupled to the second reference voltage, and a control terminal thereof receives the reset signal.

In an embodiment of the disclosure, the reference voltage includes a first reference voltage and a second reference voltage. The reset signal includes a first reset signal and a second reset signal. The reset circuit includes a first transistor, a second transistor, and a third transistor. In the first transistor, a first terminal thereof is coupled to the first reference voltage, a second terminal thereof is coupled to a first terminal of the capacitor, and a control terminal thereof receives the first reset signal. In the second transistor, a first terminal thereof is coupled to a second terminal of the capacitor, a second terminal thereof is coupled to the second reference voltage, and a control terminal thereof receives the second reset signal. In the third transistor, a first terminal thereof is coupled to the second reference voltage, and a control terminal thereof receives the first reset signal.

In an embodiment of the disclosure, an enabling period of the first reset signal does not overlap with the enabling period of the writing signal, and an enabling period of the second reset signal partially overlaps with the enabling period of the writing signal.

In an embodiment of the disclosure, the writing circuit includes a fourth transistor and a fifth transistor. In the fourth transistor, a first terminal thereof is coupled to the gray-level voltage, a second terminal thereof is coupled to the first terminal of the capacitor, and a control terminal thereof receives the writing signal. In the fifth transistor, a first terminal thereof is coupled to a third reference voltage, and a control terminal thereof receives the writing signal.

In an embodiment of the disclosure, the driving circuit includes a sixth transistor, a seventh transistor, and an eighth transistor. In the sixth transistor, a first terminal thereof is coupled to the light-emitting diode, a second terminal thereof is coupled to the second terminal of the capacitor, and a control terminal thereof receives the driving signal. In the seventh transistor, a first terminal thereof is coupled to the second terminal of the capacitor, a second terminal thereof is coupled to the first reference voltage, and a control terminal thereof is coupled to a second terminal of the third transistor and a second terminal of the fifth transistor. In the eighth transistor, a first terminal thereof is coupled to the first terminal of the capacitor, a second terminal thereof is coupled to the control terminal of the seventh transistor, and a control terminal thereof receives the driving signal.

In an embodiment of the disclosure, the first transistor to the eighth transistor are P-type transistors. The reset signal is at a logical low level during the enabling period thereof, and the writing signal is at the logical low level during the enable period thereof.

In an embodiment of the disclosure, a duration of an enabling period of the writing signal is greater than a duration of an enabling period of the gray-level voltage.

In an embodiment of the disclosure, the enabling period of the reset signal ends earlier than the enabling period of the writing signal.

In an embodiment of the disclosure, the driving circuit includes a first transistor, a second transistor, a third transistor, and a fourth transistor. In the first transistor, a first terminal thereof is coupled to a system voltage, and a control terminal thereof receives the driving signal. In the second transistor, a first terminal thereof is coupled to a second terminal of the first transistor, a second terminal thereof is coupled to a first terminal of the capacitor, and a control terminal thereof receives the driving signal. In the third transistor, a first terminal thereof is coupled to the first terminal of the second transistor, and a control terminal thereof is coupled to a second terminal of the capacitor. In the fourth transistor, a first terminal thereof is coupled to a second terminal of the third transistor, a second terminal thereof is coupled to the light-emitting diode, and a control terminal thereof receives the driving signal.

In an embodiment of the disclosure, the reference voltage includes a first reference voltage and a second reference voltage. The reset circuit includes a fifth transistor and a sixth transistor. In the fifth transistor, a first terminal thereof is coupled to the second terminal of the capacitor, a second terminal thereof is coupled to the second reference voltage, and a control terminal thereof receives the reset signal. In the sixth transistor, a first terminal thereof is coupled to the first terminal of the capacitor, a second terminal thereof is coupled to the first reference voltage, and a control terminal thereof receives the reset signal.

In an embodiment of the disclosure, the writing circuit includes a seventh transistor, an eighth transistor, and a ninth transistor. In the seventh transistor, a first terminal thereof is coupled to the first terminal of the capacitor, a second terminal thereof is coupled to the first reference voltage, and a control terminal thereof receives the writing signal. In the eighth transistor, a first terminal thereof is coupled to the first terminal of the third transistor, a second terminal thereof is coupled to the gray-level voltage, and a control terminal thereof receives the writing signal. In the ninth transistor, a first terminal thereof is coupled to the first terminal of the fourth transistor, a second terminal thereof is coupled to the second terminal of the capacitor, and a control terminal thereof receives the writing signal.

In an embodiment of the disclosure, the first transistor to the ninth transistor are P-type transistors. The reset signal is at a logical low level during the enabling period thereof, and the writing signal is at the logical low level during the enable period thereof.

From another perspective, an embodiment of the disclosure further provides a driving method of a pixel circuit, and the method includes the following steps. A reset circuit is controlled according to at least one reset signal to reset a voltage at a node based on at least one reference voltage. This node is coupled to a capacitor. A writing circuit is controlled according to a writing signal to write a gray-level voltage into the capacitor and change the voltage at the node to respond to a critical voltage. A driving circuit is controlled according to a driving signal to generate a driving current based on the voltage at the node and drive a light-emitting diode according to the driving current, where brightness of the light-emitting diode changes with the driving current. An enabling period of the reset signal partially overlaps with an enabling period of the writing signal, so that the gray-level voltage is written into the capacitor while the reference voltage is applied to the node.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
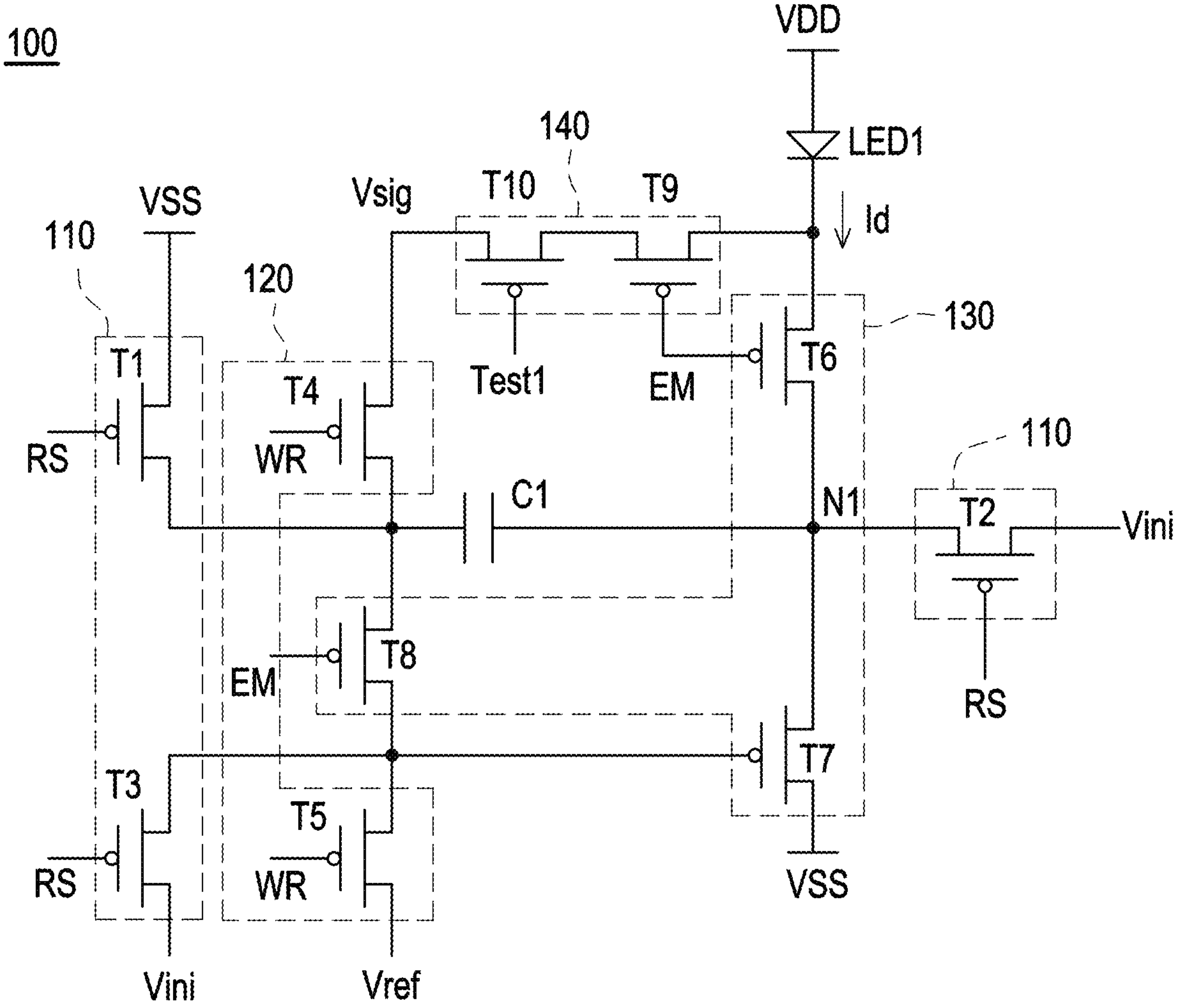
FIG. 1 is a circuit diagram illustrating a pixel circuit according to a first embodiment.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, the embodiments serve as examples of the system and method fall within the scope of the claims of the disclosure.

The terms "first", "second", etc. used herein do not particularly refer to order or sequence, but are only used to distinguish components or operations described with the same technical term.

The term "coupled to (or connected to)" used in the entire specification (including claims) refers to any direct or indirect connecting means. For instance, if the disclosure describes a first apparatus is coupled to (or connected to) a second apparatus, the description should be explained as the first apparatus is connected directly to the second apparatus, or the first apparatus, through connecting other apparatus or using certain connecting means, is connected indirectly to the second apparatus.

First Embodiment

FIG. 1 is a circuit diagram illustrating a pixel circuit according to a first embodiment. With reference to FIG. 1, a pixel circuit 100 includes a capacitor C1, a light-emitting diode LED1, a reset circuit 110, a writing circuit 120, a driving circuit 130, and a testing circuit 140. In some embodiments, the testing circuit 140 may be omitted. The capacitor C1 is coupled to a node N1.

The reset circuit 110 is controlled by a reset signal RS to reset a voltage across the capacitor C1 according to reference voltages VSS and Vini and thus resets a voltage at the node N1 as well. The writing circuit 120 is controlled by a writing signal WR to write a gray-level voltage Vsig into the capacitor C1 and change the voltage at the node N1. The driving circuit 130 is controlled by a driving signal EM and is configured to generate a driving current Id based on the voltage at the node N1, and this driving current Id drives the light-emitting diode LED1. Brightness of the light-emitting diode changes with the driving current Id. The testing circuit 140 is controlled by a testing signal Test1 and the driving signal EM to drive the light-emitting diode LED1 according to the gray-level voltage Vsig during a testing period.

For instance, the reset circuit 110 includes transistors T1 to T3, the writing circuit 120 includes transistors T4 and T5, the driving circuit 130 includes transistors T6 to T8, and the testing circuit 140 includes transistors T9 and T10. In the transistor T1, a first terminal is coupled to the reference voltage VSS, a second terminal is coupled to a first terminal of the capacitor C1, and a control terminal receives the reset signal RS. In the transistor T4, a first terminal is coupled to the gray-level voltage Vsig, a second terminal is coupled to the first terminal of the capacitor C1, and a control terminal receives the writing signal WR. In the transistor T10, a first terminal is coupled to the gray-level voltage Vsig, and a control terminal receives the testing signal Test1. In the transistor T9, a first terminal is coupled to a second terminal of the transistor T10, a second terminal is coupled to a cathode of the light-emitting diode LED1, and a control terminal receives the driving signal EM. In the transistor T6, a first terminal is coupled to the cathode of the light-emitting diode LED1, a second terminal is coupled to the node N1 and a second terminal of the capacitor C1, and a control terminal receives the driving signal EM. An anode of the light-emitting diode LED1 is coupled to a system voltage VDD. In the transistor T2, a first terminal is coupled to the second terminal of the capacitor C1, a second terminal is coupled to the reference voltage Vini, and a control terminal receives the reset signal RS. In the transistor T7, a first terminal is coupled to the second terminal of the capacitor C1, a second terminal is coupled to the reference voltage VSS, and a control terminal is coupled to a second terminal of the transistor T3 and a second terminal of the transistor T5. In the transistor T8, a first terminal is coupled to the first terminal of the capacitor C1, a second terminal is coupled to the control terminal of the transistor T7, and a control terminal receives the driving signal EM. In the transistor T3, a first terminal is coupled to the reference voltage Vini, a second terminal is coupled to the control terminal of the transistor T7, and a control terminal receives the reset signal RS. In the transistor T5, a first terminal is coupled to a reference voltage Vref, a second terminal is coupled to the control terminal of the transistor T7, and a control terminal receives the writing signal WR.

In this embodiment, the transistors T1 to T10 are P-type transistors. The reset signal RS, the writing signal WR, and the driving signal EM are at a logic low level during their respective enabling periods to turn on the corresponding transistors. In addition, the reference voltage VSS is, for example, 0 volts, the reference voltage Vini is, for example, 10 volts, and the reference voltage Vref is, for example, 7 volts. A critical voltage of the transistor T7 is, for example, −1.5 volts.

Figure 2:
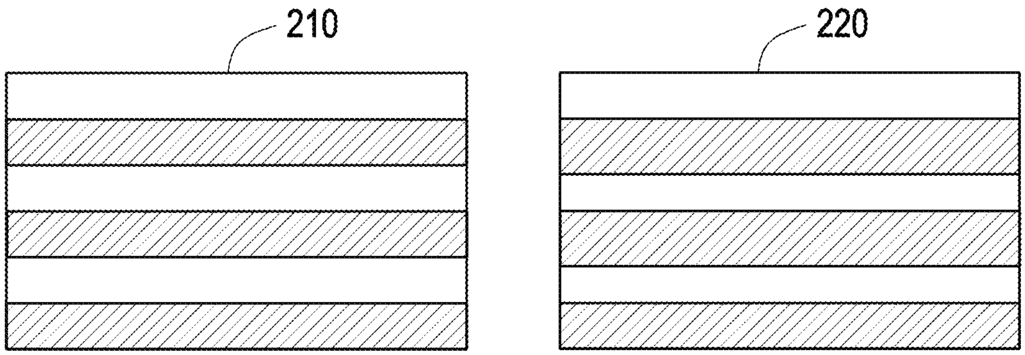
FIG. 2 is a schematic view illustrating a display pattern according to an embodiment.

In some embodiments, charging time of the pixel circuit 100 is greatly reduced, so the enabling period of the writing signal WR must be extended, which causes the gray-level voltage Vsig on a data line to change during the enabling period of the writing signal WR. When the gray-level voltage Vsig varies greatly, the voltage at the node N1 may not meet expectations due to the coupling of capacitor C1, resulting in abnormal display. FIG. 2 is a schematic view illustrating a display pattern according to an embodiment. With reference to FIG. 2, an image 210 is an image displayed when the enabling period of the writing signal WR is not extended (a correct image is displayed). An image 220 is an image displayed when the enabling period of the writing signal WR is extended. It can be seen that at a boundary of black and white stripes, pixels that shall display white display black. Therefore, in this embodiment, the enabling period of the reset signal RS is extended, so that the enabling period of the reset signal RS partially overlaps with the enabling period of the writing signal WR.

Figure 3:
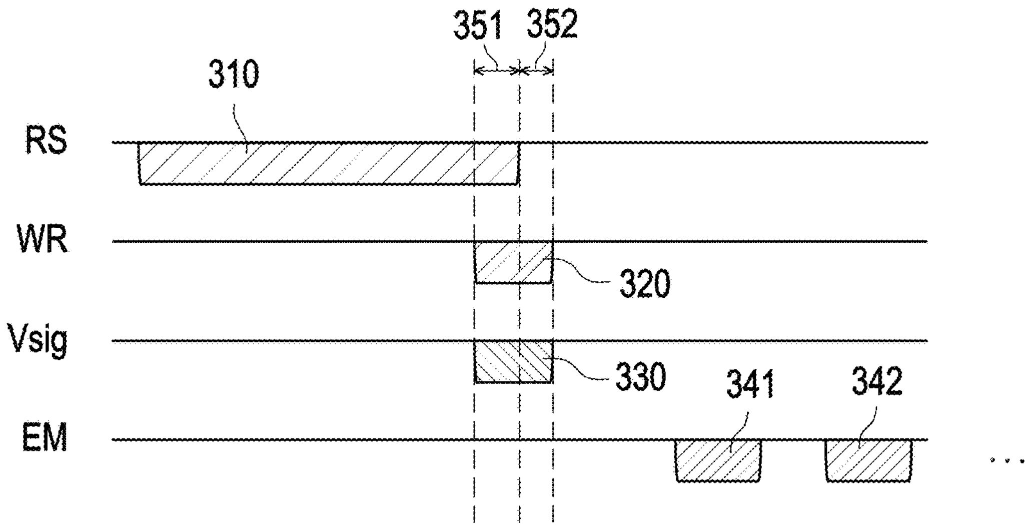
FIG. 3 is a sequence diagram illustrating various signals according to an embodiment.

FIG. 3 is a sequence diagram illustrating various signals according to an embodiment. With reference to FIG. 1 and FIG. 3, in FIG. 3, the horizontal axis is time, and the vertical axis is the voltage level of each signal. An enabling period 310 of the reset signal RS partially overlaps with an enabling period 320 of the writing signal WR and an enabling period 330 of the gray-level voltage Vsig, and an overlapping period is referred to as a first period 351. In addition, during a second period 352, the reset signal RS is not enabled, while the writing signal WR and the gray-level voltage Vsig are enabled. In other words, the enabling period 310 of the reset signal RS ends earlier than the enabling period 320 of the writing signal WR.

During the enabling period 310 of the reset signal RS, the transistors T1 to T3 are turned on. The reference voltage VSS is applied to the first terminal of the capacitor C1 and the reference voltage Vini is applied to the second terminal of the capacitor C1, so a voltage across the capacitor C1 is reset, and the voltage at the node N1 is thereby reset as well.

Figure 4:
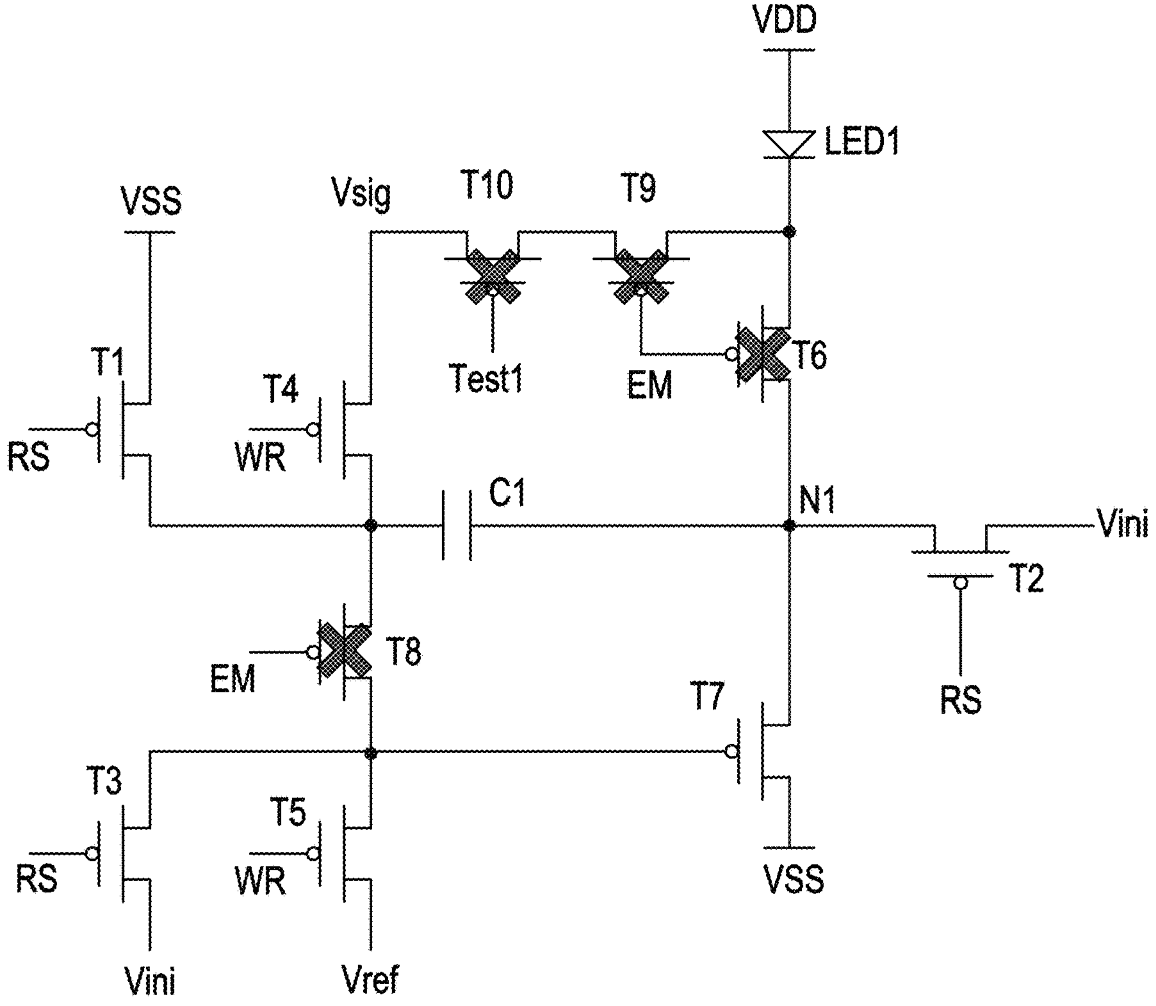
FIG. 4 is a circuit diagram illustrating a situation in which a reset signal and a writing signal are enabled simultaneously according to the first embodiment.

FIG. 4 is a circuit diagram illustrating a situation in which a reset signal and a writing signal are enabled simultaneously according to the first embodiment. With reference to FIG. 3 and FIG. 4, during the first period 351, the transistors T1 to T5 are turned on, and the transistors T6 and T8 to T10 are turned off. The gray-level voltage Vsig is applied to the first terminal of the capacitor C1, and the reference voltage Vini is applied to the node N1. That is, the gray-level voltage Vsig is written into the capacitor C1 and the reference voltage Vini is also applied to the node N1. In addition, the reference voltage Vref is applied to the control terminal of the transistor T7. Since the voltage at the control terminal of the transistor T7 minus the voltage at node N1 is less than the critical voltage of the transistor T1 ($7-10<-1.5$), the transistor T7 is turned on. In particular, the reference voltage Vini is applied to the node N1, so the variation of the gray-level voltage Vsig is not coupled to the node N1.

With reference to FIG. 1 and FIG. 3, during the second period 352, the transistors T1 to T3, T6, and T8 to T10 are turned off, and the transistors T4 and T5 are turned on. The gray-level voltage Vsig is applied to the first terminal of the capacitor C1, and the second terminal (node N1) of the capacitor C1 is floating. The reference voltage Vref is applied to the control terminal of the transistor T7. The voltage of the first terminal (coupled to the node N1) of the transistor T7 is the reference voltage Vref minus the critical voltage of the transistor T7, which is calculated as $7-(-1.5)=8.5$. That is, the voltage of the node N1 responds to the critical voltage of the transistor T7.

During the enabling periods 341 and 342 of the driving signal EM, the transistors T1 to T5, T9, and T10 are turned off, and the transistors T6 to T8 are turned on. The transistor T7 is turned on according to the voltage at the node N1 and the voltage at the first terminal of the capacitor C1 and generates the driving current Id. Since the voltage at the node N1 includes the critical voltage of the transistor T7, the critical voltage of the transistor T7 is eliminated in the calculation formula for generating the driving current Id. This process is called critical voltage compensation. In some embodiments, a length or frequency of the enabling periods 341 and 342 of the driving signal EM can be controlled to achieve a specific display brightness.

Figure 5:
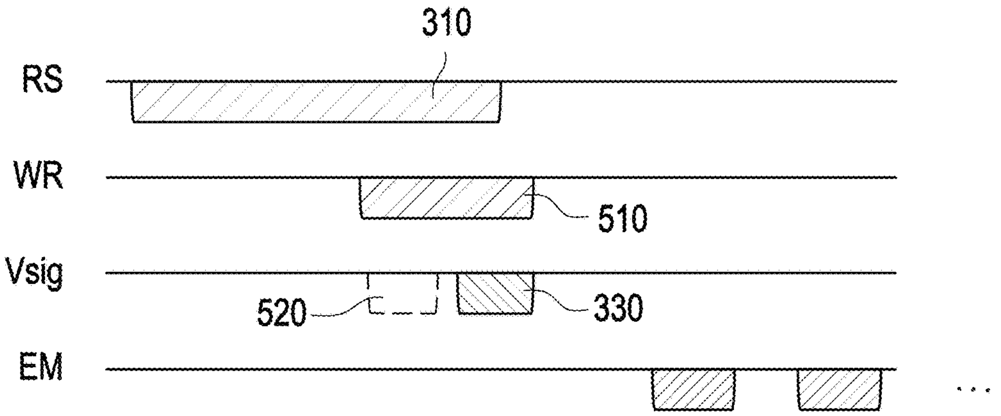
FIG. 5 is a schematic diagram illustrating extending an enabling period of the writing signal according to an embodiment.

FIG. 5 is a schematic diagram illustrating extending an enabling period of the writing signal according to an embodiment. In the embodiment of FIG. 5, a duration of an enabling period 510 of the writing signal WR is greater than a duration of the enabling period of the gray-level voltage Vsig. For instance, the duration of the enabling period of the gray-level voltage Vsig is 1 H, where His a variable, and the duration of the enabling period 510 of the writing signal WR may be 2 H, 3 H, etc., and the disclosure is not limited thereto. On the other hand, a previous enabling period 520 of the gray-level voltage Vsig is used to drive a pixel circuit of a previous row on the same data line, and this previous enabling period 520 also overlaps with the enabling period 510 of the writing signal WR. Therefore, the voltage change of the gray-level voltage Vsig is coupled to the node N1 due to the capacitor C1. For instance, the previous enabling period 520 is to display pixels with low brightness, while the enabling period 330 is to display pixels with high brightness, and this phenomenon is like the junction of black and white stripes in FIG. 2. In this case, the gray-level voltage Vsig may drop significantly, and the voltage at the node N1 may also drop through the coupling of capacitor C1. In this embodiment, since the enabling period 310 of the reset signal RS also overlaps with the previous enabling period 520, the above coupling may not cause abnormal display.

Figure 6:
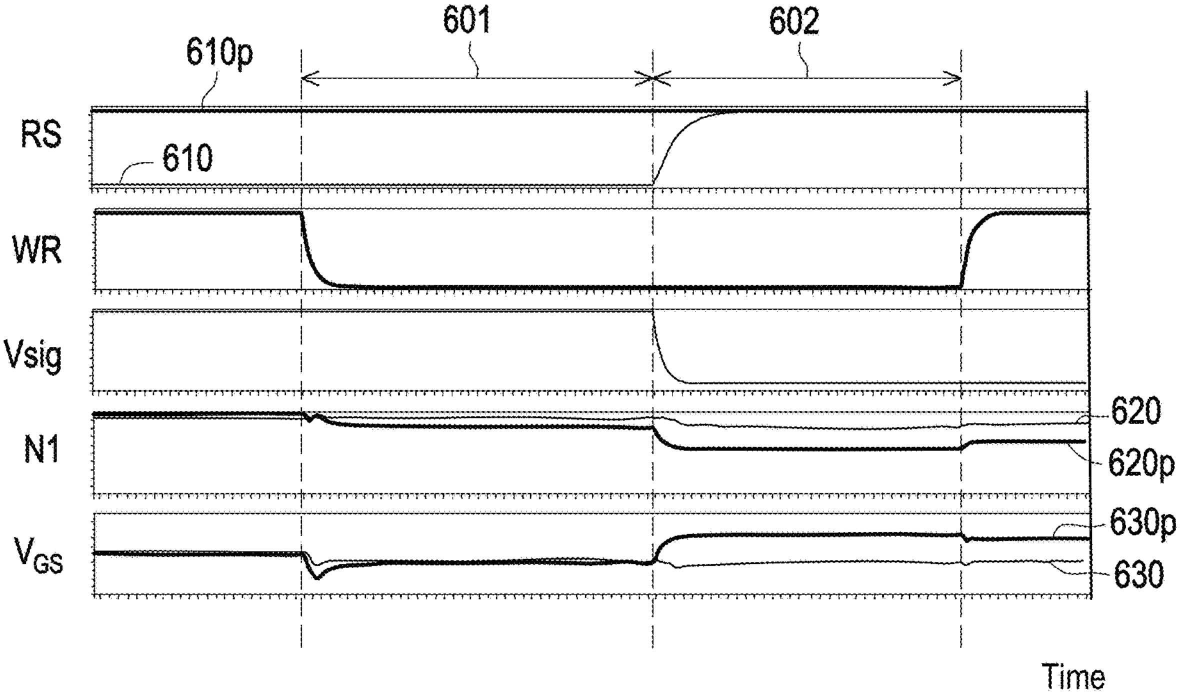
FIG. 6 is a sequence diagram illustrating a voltage at a node N1 and various signals according to an embodiment.

To be specific, FIG. 6 is a sequence diagram illustrating the voltage at the node N1 and various signals according to an embodiment. With reference to FIG. 4 and FIG. 6, the reset signal RS has two voltage curves 610 and 610*p*, where the voltage curve 610*p* represents the related art, and the voltage curve 610 represents the current embodiment. Similarly, the node N1 has two voltage curves 620 and 620*p*, where the voltage curve 620*p* represents the related art, and the voltage curve 620 represents the current embodiment. A voltage VGS represents a voltage difference between the control terminal of transistor T1 and the node N1. The voltage VGS also has two voltage curves 630*p* and 630, where the voltage curve 630*p* represents the related art, and the voltage curve 630 represents the current embodiment.

During a first period 601, the voltage curve 610*p* is at a logic high level, and the voltage curve 610 is at a logic low level. The writing signal WR is at a logic low level. The gray-level voltage Vsig is not enabled, but in order to drive the pixel circuit of the previous row on the same data line, the voltage on the data line changes, and this change is coupled to the node N1. As a result, the voltage curve 620*p* is affected by the voltage variation on the data line and is reduced. On the contrary, with reference to the voltage curve 620, since the reference voltage Vini is applied to the node N1 in this embodiment, the voltage at the node N1 is less affected.

During a second period 602, the voltage curves 610 and 610*p* are both at a logic high level. The writing signal WR is at a logic low level, and the gray-level voltage Vsig is enabled. Due to the effect of the previous capacitive coupling, the voltage curve 620*p* is lower than the voltage curve 620, which makes the voltage curve 630*p* of the voltage VGS higher than the voltage curve 630. The voltage curve 630*p* may not turn on the transistor T7 correctly, which may cause display abnormality, but the voltage curve 630 generated in this embodiment can solve this problem.

In the first terminal, when the reset signal RS and the writing signal WR are both enabled, the gray-level voltage Vsig is short-circuited to the reference voltage VSS through the transistors T4 and T1, which forms a leakage current. This leakage current problem is solved in the following second embodiment.

Second Embodiment

Figure 7:
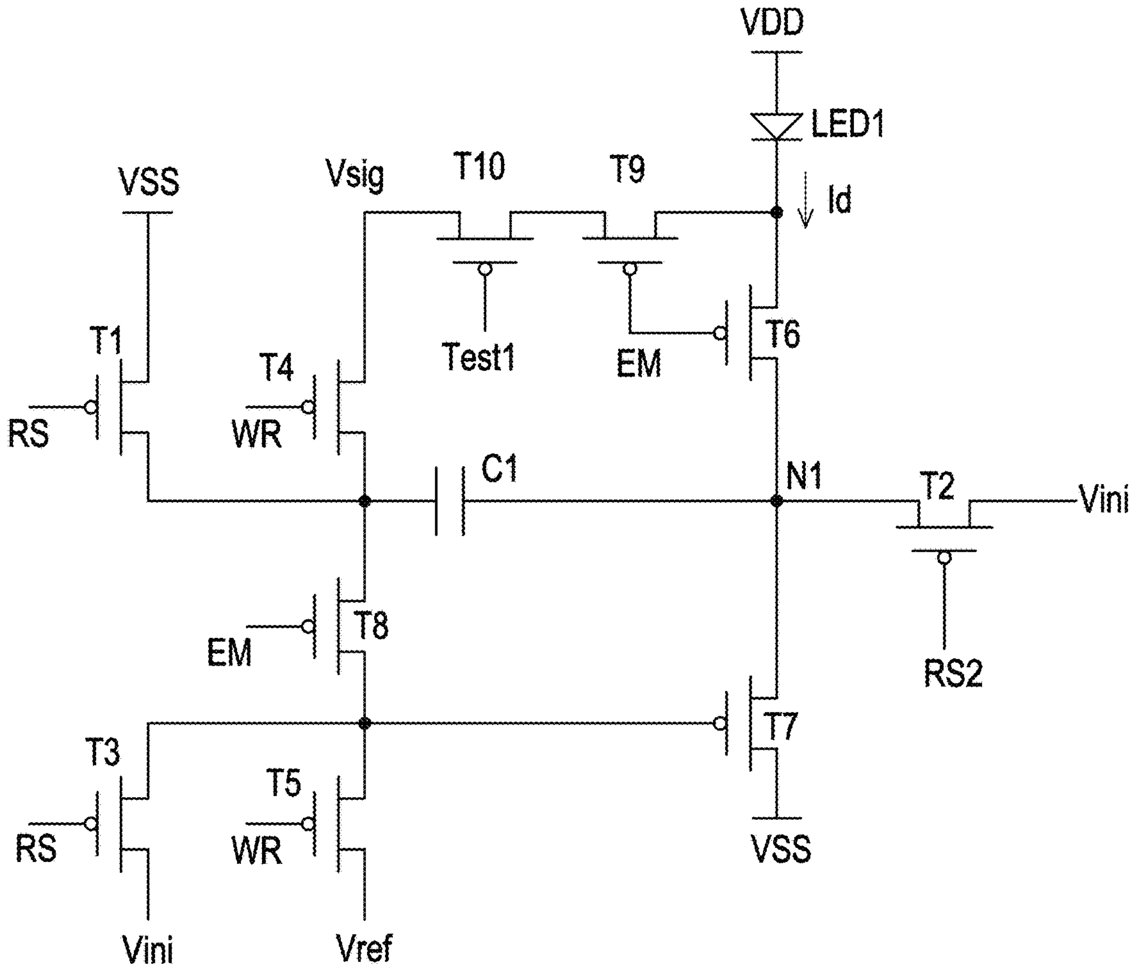
FIG. 7 is a circuit diagram illustrating a pixel circuit according to a second embodiment.

FIG. 7 is a circuit diagram illustrating a pixel circuit according to the second embodiment. With reference to FIG. 7, FIG. 7 is different from FIG. 1 in that the control terminal of transistor T2 receives a reset signal RS2, and this reset signal RS2 is different from the reset signal RS.

Figure 8:
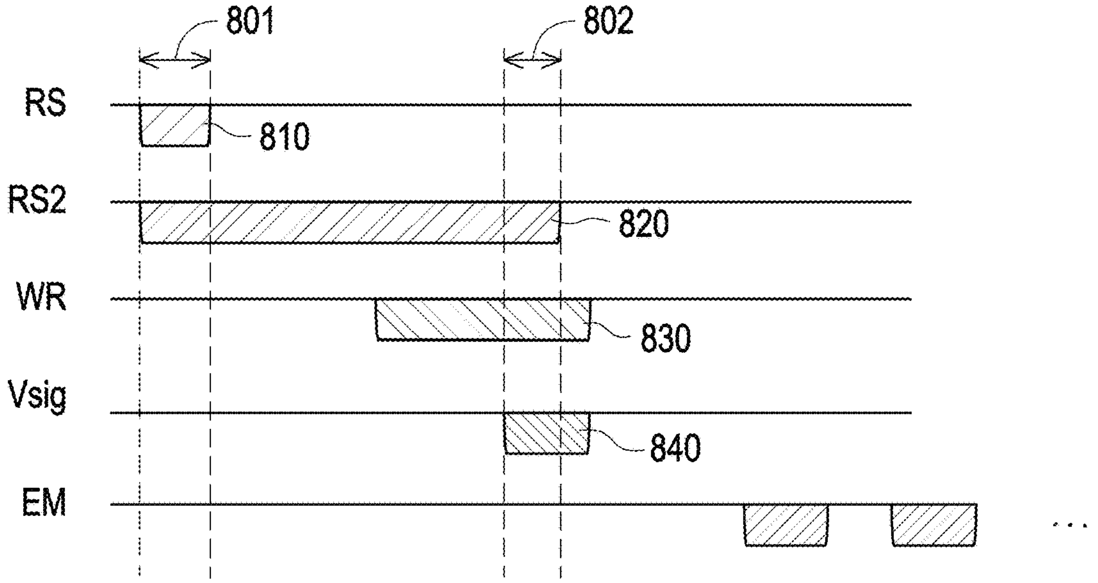
FIG. 8 is a sequence diagram illustrating various signals according to the second embodiment.

FIG. 8 is a sequence diagram illustrating various signals according to the second embodiment. With reference to FIG. 8, an enabling period 810 of the reset signal RS does not overlap with an enabling period 830 of the writing signal WR. An enabling period 820 of the reset signal RS2 partially overlaps with an enabling period 830 of the writing signal WR and an enabling period 840 of the gray-level voltage Vsig.

During a first period 801, both the reset signal RS and the reset signal RS2 are enabled. The transistors T1 to T3 are turned on and the transistors T4 to T10 are turned off, so the voltage across capacitor C1 is thereby reset.

Figure 9:
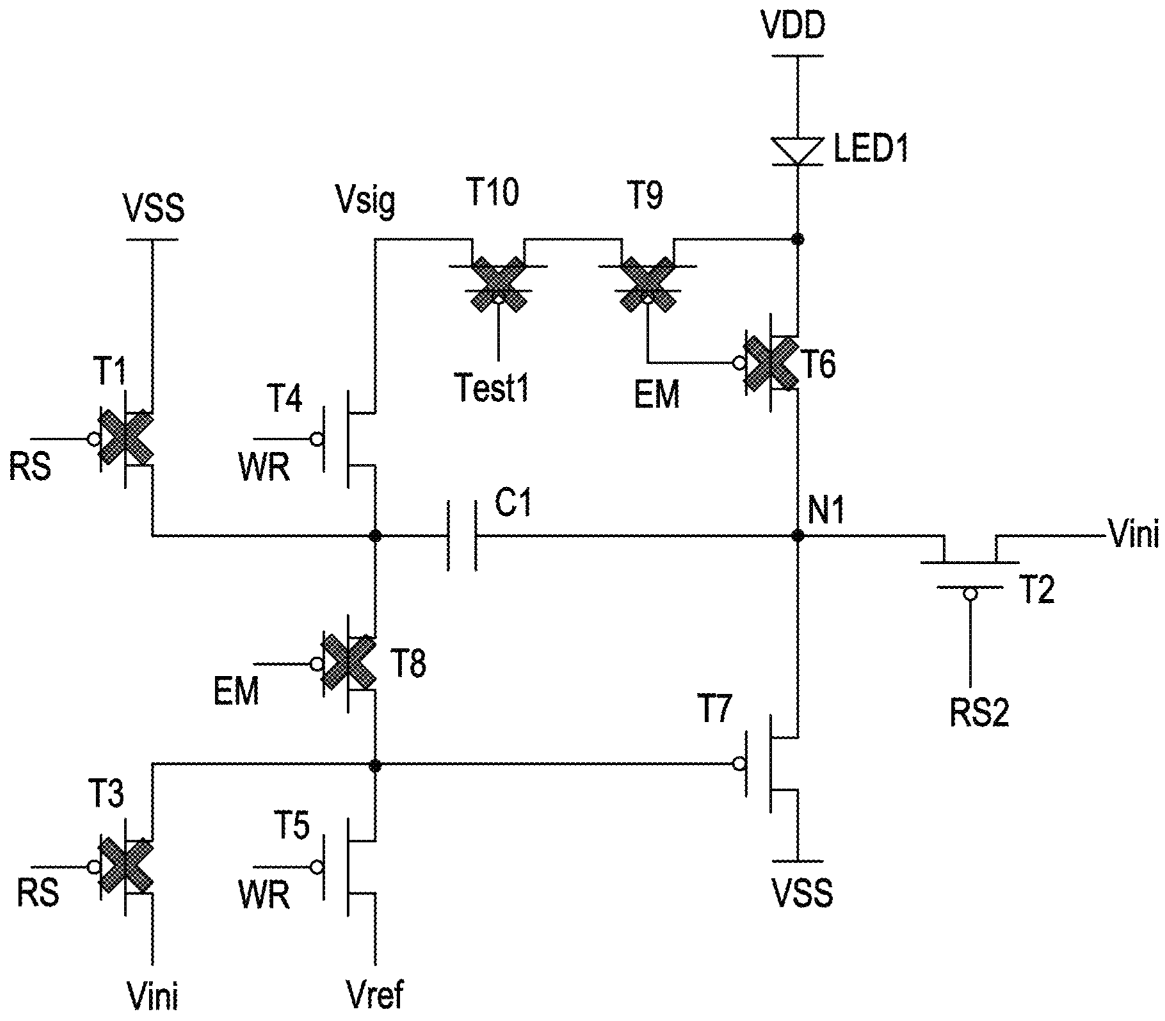
FIG. 9 is a schematic diagram illustrating a circuit during a second period 802 according to the second embodiment.

FIG. 9 is a schematic diagram illustrating a circuit during a second period 802 according to the second embodiment. During the second period 802, the reset signal RS is not enabled, and the reset signal RS2 and the writing signal WR are enabled. The transistors T1, T3, T6, and T8 to T10 are turned off, and the transistors T2, T4, T5, and T7 are turned on. When the gray-level voltage Vsig is written into the capacitor C1, the reference voltage Vini is applied to the node N1. Therefore, the voltage variation on the data line may be prevented from coupling to the node N1. In addition, no leakage current may be generated on a path from the gray-level voltage Vsig to the reference voltage VSS. For the operations during other periods, reference may be made to the first embodiment, so description thereof is not repeated herein.

Third Embodiment

Figure 10:
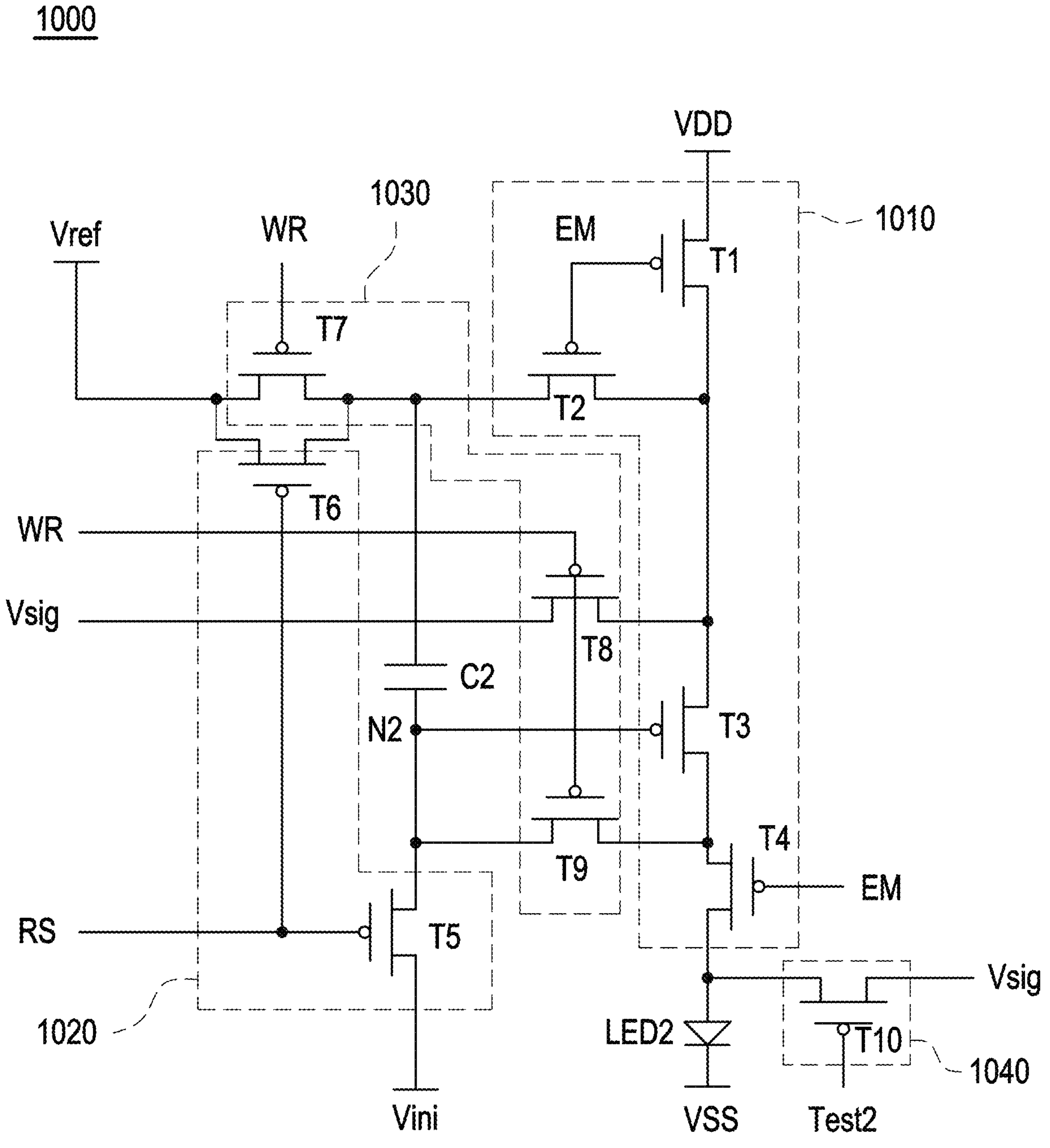
FIG. 10 is a circuit diagram illustrating a pixel circuit according to a third embodiment.

FIG. 10 is a circuit diagram illustrating a pixel circuit according to the third embodiment. With reference to FIG. 10, a pixel circuit 1000 includes a driving circuit 1010, a reset circuit 1020, a writing circuit 1030, a testing circuit 1040, a capacitor C2, and a light-emitting diode LED2. The capacitor C2 is coupled to a node N2. The driving circuit 1010 includes transistors T1 to T4, the reset circuit 1020 includes transistors T5 to T6, the writing circuit 1030 includes transistors T7 to T9, and the testing circuit 1040 includes a transistor T10. In some embodiments, the testing circuit 1040 may be omitted as well.

In the transistor T1, a first terminal is coupled to the system voltage VDD, and a control terminal receives the driving signal EM. In the transistor T2, a first terminal is coupled to a second terminal of the transistor T1, a second terminal is coupled to a first terminal of the capacitor C2, and a control terminal receives the driving signal EM. In the transistor T3, a first terminal is coupled to the first terminal of the transistor T2, and a control terminal is coupled to a second terminal of the capacitor C2. In the transistor T4, a first terminal is coupled to a second terminal of the transistor T3, a second terminal is coupled to an anode of the light-emitting diode LED2, and a control terminal receives the driving signal EM. A cathode of the light-emitting diode LED2 is coupled to the reference voltage VSS. In the transistor T5, a first terminal is coupled to the second terminal of the capacitor C2, a second terminal is coupled to the reference voltage Vini, and a control terminal receives the reset signal RS. In the transistor T6, a first terminal is coupled to the first terminal of the capacitor C2, a second terminal is coupled to the reference voltage Vref, and a control terminal receives the reset signal RS. In the transistor T7, a first terminal is coupled to the first terminal of the capacitor C2, a second terminal is coupled to the reference voltage Vref, and a control terminal receives the writing signal WR. In the transistor T8, a first terminal is coupled to the first terminal of the transistor T3, a second terminal is coupled to the gray-level voltage Vsig, and a control terminal receives the writing signal WR. In the transistor T9, a first terminal is coupled to the first terminal of the transistor T4, a second terminal is coupled to the second terminal of the capacitor C2, and a control terminal receives the writing signal WR. In the transistor T10, a first terminal is coupled to the gray-level voltage Vsig, a second terminal is coupled to the anode of the light-emitting diode LED2, and a control terminal receives a testing signal Test2.

In some embodiments, the transistors T1 to T10 are P-type transistors. The reset signal RS, the writing signal WR, and the driving signal EM are at a logic low level during their respective enabling periods. The sequence diagrams of the reset signal RS, the writing signal WR, the gray-level voltage Vsig, and the driving signal EM may refer to FIG. 3, FIG. 5, or FIG. 6. In other words, the signal sequence diagram of the first embodiment may be applied in the third embodiment.

With reference to FIG. 3 and FIG. 10, during the enabling period 310 of the reset signal RS, the transistors T5 and T6 are turned on. The reference voltage Vref is applied to the first terminal of the capacitor C2, and the reference voltage Vini is applied to the second terminal of the capacitor C2.

Figure 11:
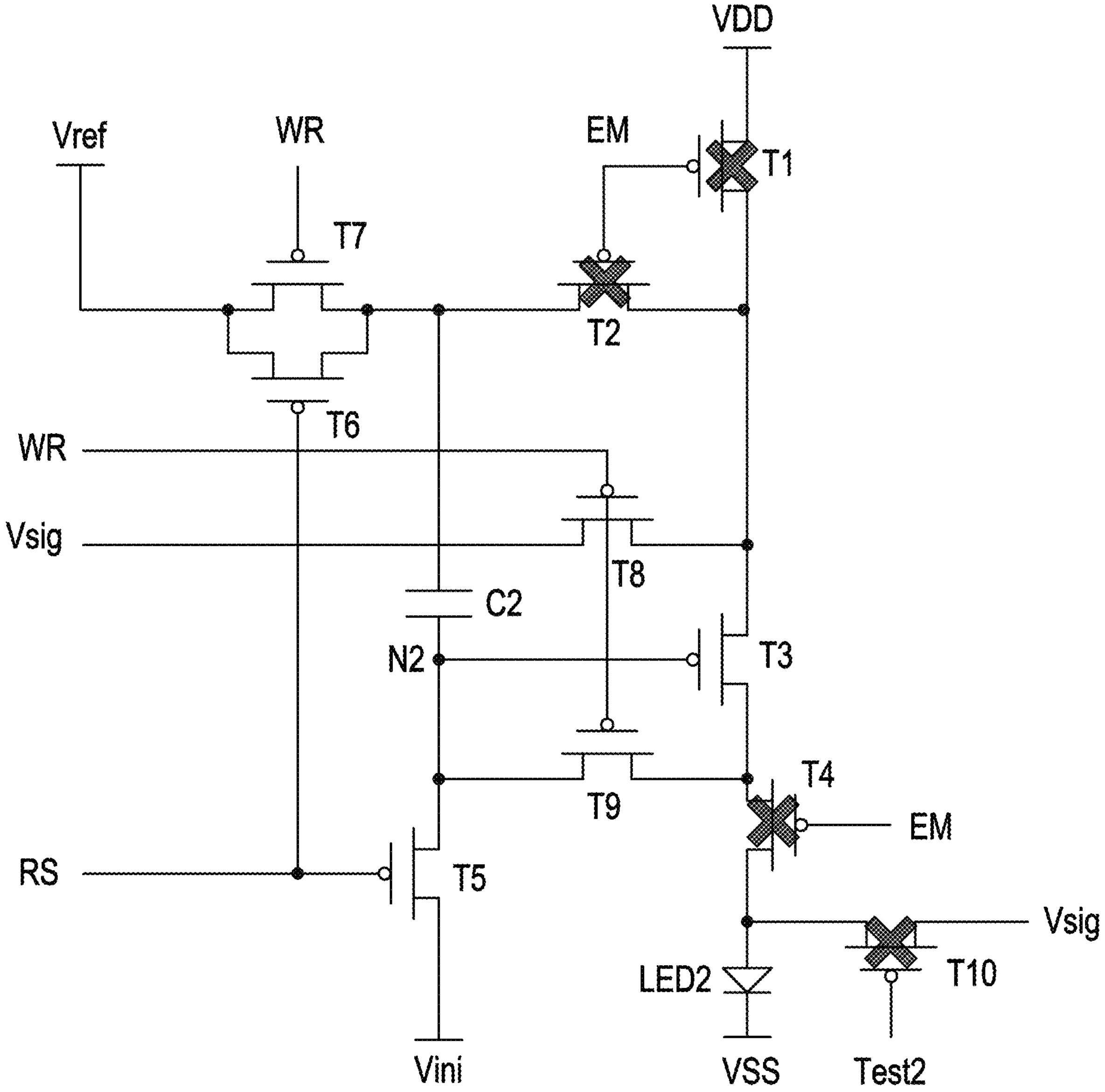
FIG. 11 is a schematic diagram illustrating the pixel circuit during a first period 351 according to the third embodiment.

FIG. 11 is a schematic diagram illustrating the pixel circuit during the first period 351 according to the third embodiment. With reference to FIG. 3 and FIG. 11, during the first period 351, the transistors T1, T2, T4, and T10 are turned off, while the transistors T3 and T5 to T9 are turned on. When the gray-level voltage Vsig is written into the capacitor C2 through the transistors T8, T3, and T9, the reference voltage Vini is applied to the node N2.

During the second period 352, the transistors T3 and T7 to T9 are turned on, and the other transistors are turned off. A voltage at the node N2 responds to the critical voltage of the transistor T3. During the enabling periods 341 and 342 of the driving signal EM, the transistors T1 to T4 are turned on, and other transistors are turned off. The transistor T3 generates a driving current according to the voltage at the node N2 to drive the light-emitting diode LED2.

Similar to the first embodiment, since the enabling period 310 of the reset signal RS partially overlaps with the enabling period 320 of the writing signal WR, the voltage change on the data line where the gray-level voltage Vsig is located may not cause an abnormal voltage change on the node N2.

Figure 12:
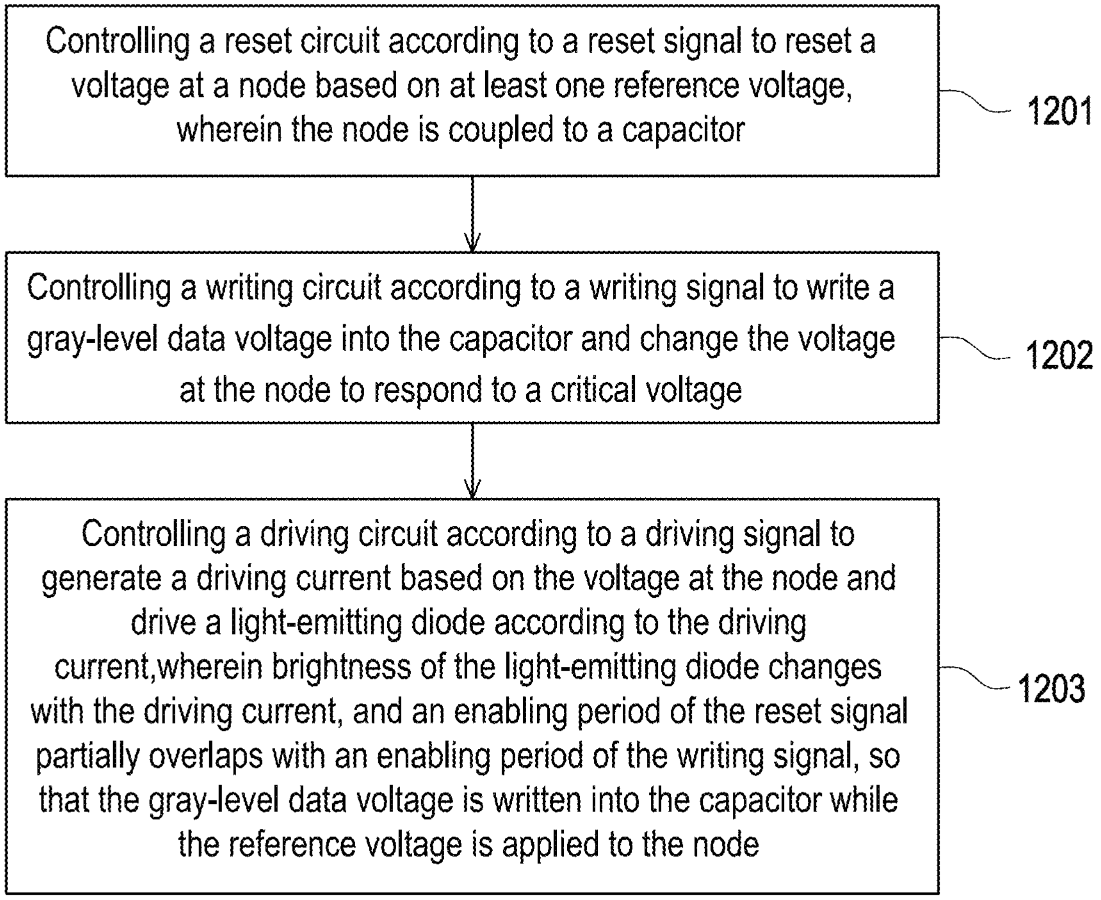
FIG. 12 is a flow chart illustrating a driving method of a pixel circuit according to an embodiment.

FIG. 12 is a flow chart illustrating a driving method of a pixel circuit according to an embodiment. With reference to FIG. 12, the flow chart of FIG. 12 may be applied to the pixel circuits of FIG. 1, FIG. 7, and FIG. 10. In step 1201, a reset circuit is controlled according to a reset signal to reset a voltage at a node based on at least one reference voltage. This node is coupled to a capacitor. In step 1202, a writing circuit is controlled according to a writing signal to write a gray-level voltage into the capacitor and change the voltage at the node to respond to a critical voltage. In step 1203, a driving circuit is controlled according to a driving signal to generate a driving current based on the voltage at the node and drive a light-emitting diode according to the driving current, where brightness of the light-emitting diode changes with the driving current. In particular, an enabling period of the reset signal partially overlaps with an enabling period of the writing signal, so that the gray-level voltage is written into the capacitor while the reference voltage is applied to the node. Each step of FIG. 12 is described in detail in the foregoing paragraphs, so description thereof is not repeated herein. It should be noted that each step of FIG. 12 may be implemented as a plurality of program codes or circuits, which is not particularly limited by the disclosure. In addition, the method of FIG. 12 may be used together with the above embodiments or may be used alone. In other words, other steps may be added among the steps of FIG. 12.

In the above circuit and method, the enabling period of the reset signal partially overlaps with the enabling period of the writing signal, so that the problem of the voltage change on the data line being coupled to the node is solved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A pixel circuit, comprising:

a capacitor coupled to a node;

a reset circuit controlled by at least one reset signal and configured to reset a voltage at the node based on at least one reference voltage;

a writing circuit controlled by a writing signal and configured to write a gray-level voltage into the capacitor and change the voltage at the node to respond to a critical voltage;

a driving circuit controlled by a driving signal and configured to generate a driving current based on the voltage at the node; and a light-emitting diode coupled to the driving circuit, wherein brightness of the light-emitting diode changes with the driving current, wherein an enabling period of the at least one reset signal partially overlaps with an enabling period of the writing signal, so that the gray-level voltage is written into the capacitor while the at least one reference voltage is applied to the node, wherein a duration of the enabling period of the writing signal is greater than a duration of an enabling period of the gray-level voltage.

2. The pixel circuit according to claim 1, wherein the at least one reference voltage comprises a first reference voltage and a second reference voltage, and the reset circuit comprises:

a first transistor, wherein a first terminal thereof is coupled to the first reference voltage, a second terminal thereof is coupled to a first terminal of the capacitor, and a control terminal thereof receives the at least one reset signal;

a second transistor, wherein a first terminal thereof is coupled to a second terminal of the capacitor, a second terminal thereof is coupled to the second reference voltage, and a control terminal thereof receives the at least one reset signal; and a third transistor, wherein a first terminal thereof is coupled to the second reference voltage, and a control terminal thereof receives the at least one reset signal.

3. The pixel circuit according to claim 2, wherein the writing circuit comprises:

a fourth transistor, wherein a first terminal thereof is coupled to the gray-level voltage, a second terminal thereof is coupled to the first terminal of the capacitor, and a control terminal thereof receives the writing signal; and a fifth transistor, wherein a first terminal thereof is coupled to a third reference voltage, and a control terminal thereof receives the writing signal.

4. The pixel circuit according to claim 3, wherein the driving circuit comprises:

a sixth transistor, wherein a first terminal thereof is coupled to the light-emitting diode, a second terminal thereof is coupled to the second terminal of the capacitor, and a control terminal thereof receives the driving signal;

a seventh transistor, wherein a first terminal thereof is coupled to the second terminal of the capacitor, a second terminal thereof is coupled to the first reference voltage, and a control terminal thereof is coupled to a second terminal of the third transistor and a second terminal of the fifth transistor; and an eighth transistor, wherein a first terminal thereof is coupled to the first terminal of the capacitor, a second terminal thereof is coupled to the control terminal of the seventh transistor, and a control terminal thereof receives the driving signal.

5. The pixel circuit according to claim 4, wherein the first transistor to the eighth transistor are P-type transistors, the at least one reset signal is at a logical low level during the enabling period of the at least one reset signal, and the writing signal is at the logical low level during the enable period of the writing signal.

6. The pixel circuit according to claim 1, wherein the at least one reference voltage comprises a first reference voltage and a second reference voltage, the at least one reset signal comprises a first reset signal and a second reset signal, and the reset circuit comprises:

a first transistor, wherein a first terminal thereof is coupled to the first reference voltage, a second terminal thereof is coupled to a first terminal of the capacitor, and a control terminal thereof receives the first reset signal;

a second transistor, wherein a first terminal thereof is coupled to a second terminal of the capacitor, a second terminal thereof is coupled to the second reference voltage, and a control terminal thereof receives the second reset signal; and a third transistor, wherein a first terminal thereof is coupled to the second reference voltage, and a control terminal thereof receives the first reset signal.

7. The pixel circuit according to claim 6, wherein an enabling period of the first reset signal does not overlap with the enabling period of the writing signal, and an enabling period of the second reset signal partially overlaps with the enabling period of the writing signal.

8. The pixel circuit according to claim 1, wherein the enabling period of the at least one reset signal ends earlier than the enabling period of the writing signal.

9. The pixel circuit according to claim 1, wherein the driving circuit comprises:

a first transistor, wherein a first terminal thereof is coupled to a system voltage, and a control terminal thereof receives the driving signal;

a second transistor, wherein a first terminal thereof is coupled to a second terminal of the first transistor, a second terminal thereof is coupled to a first terminal of the capacitor, and a control terminal thereof receives the driving signal;

a third transistor, wherein a first terminal thereof is coupled to the first terminal of the second transistor, and a control terminal thereof is coupled to a second terminal of the capacitor; and a fourth transistor, wherein a first terminal thereof is coupled to a second terminal of the third transistor, a second terminal thereof is coupled to the light-emitting diode, and a control terminal thereof receives the driving signal.

10. The pixel circuit according to claim 9, wherein the at least one reference voltage comprises a first reference voltage and a second reference voltage, and the reset circuit comprises:

a fifth transistor, wherein a first terminal thereof is coupled to the second terminal of the capacitor, a second terminal thereof is coupled to the second reference voltage, and a control terminal thereof receives the at least one reset signal; and a sixth transistor, wherein a first terminal thereof is coupled to the first terminal of the capacitor, a second terminal thereof is coupled to the first reference voltage, and a control terminal thereof receives the at least one reset signal.

11. The pixel circuit according to claim 10, wherein the writing circuit comprises:

a seventh transistor, wherein a first terminal thereof is coupled to the first terminal of the capacitor, a second terminal thereof is coupled to the first reference voltage, and a control terminal thereof receives the writing signal;

an eighth transistor, wherein a first terminal thereof is coupled to the first terminal of the third transistor, a second terminal thereof is coupled to the gray-level voltage, and a control terminal thereof receives the writing signal; and a ninth transistor, wherein a first terminal thereof is coupled to the first terminal of the fourth transistor, a second terminal thereof is coupled to the second terminal of the capacitor, and a control terminal thereof receives the writing signal.

12. The pixel circuit according to claim 11, wherein the first transistor to the ninth transistor are P-type transistors, the at least one reset signal is at a logical low level during the enabling period of the at least one reset signal, and the writing signal is at the logical low level during the enable period of the writing signal.

13. A driving method of a pixel circuit, comprising:

controlling a reset circuit according to at least one reset signal to reset a voltage at a node based on at least one reference voltage, wherein the node is coupled to a capacitor;

controlling a writing circuit according to a writing signal to write a gray-level voltage into the capacitor and change the voltage at the node to respond to a critical voltage; and controlling a driving circuit according to a driving signal to generate a driving current based on the voltage at the node and drive a light-emitting diode according to the driving current, wherein brightness of the light-emitting diode changes with the driving current, wherein an enabling period of the at least one reset signal partially overlaps with an enabling period of the writing signal, so that the gray-level voltage is written into the capacitor while the at least one reference voltage is applied to the node, wherein a duration of an enabling period of the writing signal is greater than a duration of an enabling period of the gray-level voltage.

14. The driving method according to claim 13, wherein the enabling period of the at least one reset signal ends earlier than the enabling period of the writing signal.

* * * * *